United States Patent [19]

Dibrell et al.

[11] Patent Number: 4,754,612
[45] Date of Patent: Jul. 5, 1988

[54] METHOD FOR OPTIMIZING THE MECHANICAL OUTPUT OF A FLUID PRESSURE FREE PISTON ENGINE

[75] Inventors: Edwin W. Dibrell; Wilbur A. Schaich, both of San Antonio, Tex.

[73] Assignee: Centrifugal Piston Expander, Inc., San Antonio, Tex.

[21] Appl. No.: 41,949

[22] Filed: Apr. 24, 1987

[51] Int. Cl.⁴ ................................................. F25B 9/00
[52] U.S. Cl. .......................................... 62/87; 60/698; 60/711
[58] Field of Search ................. 62/87, 86; 60/698, 711

[56] References Cited

U.S. PATENT DOCUMENTS

| | | | |
|---|---|---|---|
| 4,269,280 | 5/1981 | Rosen | 60/711 |
| 4,420,945 | 12/1983 | Dibrell | 62/86 |
| 4,433,551 | 2/1984 | Dibrell | 62/87 |
| 4,449,379 | 5/1984 | Dibrell | 62/401 |
| 4,513,575 | 4/1985 | Dibrell | 62/86 |

FOREIGN PATENT DOCUMENTS

813990 5/1959 United Kingdom ................. 60/698

*Primary Examiner*—Ronald C. Capossela
*Attorney, Agent, or Firm*—William C. Norvell, Jr.

[57] ABSTRACT

A fluid pressure, free piston engine, such as a centrifugal piston expander, provides a cyclically varying torque to a rotatable output shaft. A unidirectional or overrunning rotational clutch comprising two relatively rotatable elements has one element secured to a unidirectionally rotatable load and the other element driven by the output shaft of the centrifugal piston expander. The engine output shaft further drives, through appropriate gearing, a battery operated, starting motor-generator unit. The motor-generator is employed to initially rotate the expander to sufficient speed to ensure the centrifugal return of the free pistons of the centrifugal piston expander to their radially outermost positions. After start-up of the centrifugal piston expander, the starting motor functions as a generator to recharge the battery during the high torque portions of rotation of the engine output shaft, and during the low torque portions of the power output shaft, again functions as a motor to increase such speed. A plurality of fluid pressure engines may be connected to the same output shaft and selectively energized to further minimize the cyclical swing in speed of the power output shaft and to provide variable displacement operation by automatically varying the number of engines utilized to accommodate a varying load.

4 Claims, 1 Drawing Sheet

METHOD FOR OPTIMIZING THE MECHANICAL OUTPUT OF A FLUID PRESSURE FREE PISTON ENGINE

BACKGROUND OF THE INVENTION

1. Summary of the Prior Art:

The term "centrifugal piston expander" was first defined in prior U.S. Pat. No. 4,513,575 as comprising a rotating body upon which one or more cylinders are mounted for co-rotation. Each cylinder defines a fluid pressure chamber extending from a point remote from the axis of rotation of the rotating body to a point proximate to the axis of rotation. The longitudinal axis of the fluid pressure chamber may be linear or arcuate but, in any event, no substantial portion of the longitudinal axis is radially disposed with respect to the rotational axis. A free piston is mounted within the cylinder for sliding, sealable movements through the pressure chamber. When the piston reaches its outermost position in the pressure chamber, an inlet valve is actuated and a charge of pressured gas is introduced into the fluid pressure chamber which drives the piston radially inwardly toward the axis of rotation by expansion of the pressured gas. The reaction force of the gas on the outermost end of the cylinder produces a torque to assist in the rotation of the rotating body. The pistons are returned to their outermost positions primarily by centrifugal force acting on such pistons, hence, a starting motor is required to get the centrifugal piston expander engine up to a sufficient rotatable speed to ensure the return of the pistons to their outermost positions.

A variety of centrifugal piston expander engines are disclosed in the aforementioned patent and also in prior U.S. Pat. Nos. 4,420,945; 4,433,551 and 4,449,379, assigned to the assignee of this application. In U.S. Pat. No. 4,433,551 there is disclosed in FIG. 5, a schematic diagram of the necessary apparatus for effecting a continuous circulation of the pressured gas employed to drive the centrifugal piston expander including a heat exchanger receiving the cooled expanded gas for refrigeration or air cooling purposes.

Further experimentation with centrifugal piston expander engines has revealed that the output torque produced by any such engine utilizing a free piston which is centrifugally returned to its outermost position in a cooperating cylinder, is generally of a cyclical nature and may actually generate a negative torque (with respect to the desired direction of the output shaft) during a portion of each cycle. Such negative torque results in a serious fluctuation in the speed of the rotary load driven unidirectionally by the power output shaft of the centrifugal piston expander engine. The reduction in such speed fluctuation is a primary object of the present invention.

SUMMARY OF THE INVENTION

In accordance with this invention, the output shaft of a centrifugal piston expander engine is connected to one element of a rotatable, unidirectional or over-running clutch, such as, for example, the "Form-sprag" clutch offered for sale by DANA CORPORATION of Toledo, OH. Such clutches comprise an inner rotatable element which is telescopically mounted within an outer rotatable element and connected to the outer rotatable element in only one direction of rotation by a plurality of peripherally spaced sprags. One rotatable element of the overrunning clutch is secured to the rotary load, and the other element of the overrunning clutch is keyed to the output shaft of the centrifugal piston expander engine and transmits power through such rotatable element in only one direction, if desired, to the load, thus permitting the load to rotate in overrunning relationship to the engine shaft. To minimize the cyclic variations in speed which inherently would result in the load shaft due to the cyclic application of torque from the centrifugal piston expander engine, a relatively large gear, or an equivalent gear ratio gear box, is secured to the output shaft of the centrifugal piston expander engine to drive a relatively small gear secured to the shaft of a battery driven motor-generator. The motor-generator thus functions as a starting motor to get the centrifugal piston expander engine initially rotating at a sufficiently high speed to ensure the return of the free pistons to their outermost positions. During the positive torque portions of the output of the centrifugal piston expander engine, the motor-generator will be over-speeded and hence will function as a generator to recharge the battery. Conversely, during the lower speed or negative torque portions of the output cycle of the centrifugal piston expander engine, the starting motor-generator will again be powered by the battery to drive the engine and load in the positive torque direction to restore the speed to the normal speed of the starting motor, and thus the variation in rotational speed of the load will be substantially diminished, thus optimizing the performance of the centrifugal piston expander engine. The starting motor-generator thus functions as an electric flywheel.

In a modification of this invention, a plurality of centrifugal piston expander engines may be mounted in axially spaced relationship upon the same output shaft, or gear connected to a common shaft. With this arrangement, the pressured gas may be sequentially applied to the cylinders of the respective centrifugal piston expander engines and thus the positive part of the torque period of one centrifugal piston expander engine may be balanced against a negative torque period of another centrifugal piston expander engine, further contributing to the maintenance of a substantially constant rotating load speed. Further, variable displacement of the plurality of engines may be utilized by automatically activating or deactivating each engine unit to accommodate a varying load. Since each centrifugal piston expander engine operates without a crankshaft, the pistons of each deactivated centrifugal piston expander engine cease to create friction and drag on the ouput.

In a preferred modification, a speed-responsive inlet valve may be employed on all of the fluid pressure responsive engines to supply inlet fluid pressure to the respective engines only when the speed of rotation drops below a pre-selected value for each engine. This results in an automatic adjustment of cylinder displacement and provides the results of an automatic transmission.

Further objects and advantages of the invention will be readily apparent to those skilled in the art from the following detailed description, taken in conjunction with the annexed sheets of drawings, on which is shown a number of preferred embodiments of the invention.

DESCRIPTION OF PREFERRED EMBODIMENT

Figure 1:
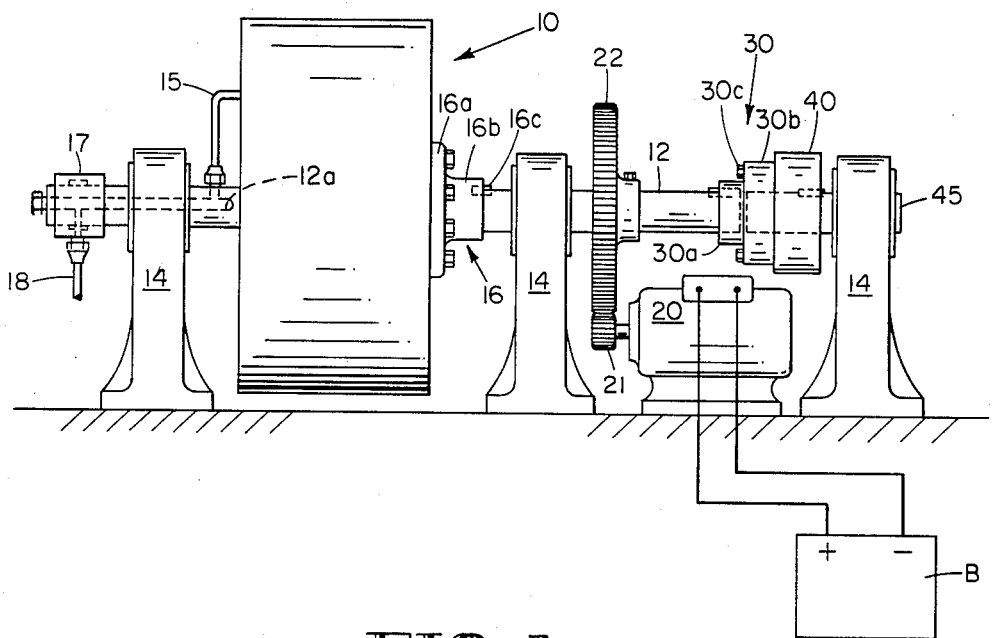
FIG. 1 is a schematic elevational view of an apparatus operating in accordance with the method of this invention to minimize the rotational output speed of an output shaft of a centrifugal piston expander engine.

Referring to FIG. 1 of the drawings, a fluid pressure driven engine 10 having a cyclically variable torque output is mounted on the load shaft 12 which is supported at opposite ends by bearing pillars 14. While not limited thereto, the fluid pressure engine 10 may comprise any one of the engines described in the aforementioned prior patents and which are characterized by having a plurality of cylinders rotatable about the axis of the load output shaft 12. The axes of the various cylinders (not shown) are non-radial with respect to the axis of the load output shaft 12, but are disposed so that the cylinder has an outer end radially displaced from an inner end. Free pistons are respectively mounted in the cylinders and reciprocate between said inner and outer ends. Inlet and exhaust valves (not shown here but described in the aforementioned prior patents) supply fluid pressure to the outer ends of the cylinders when the pistons approach such outer ends and also exhaust cooled, expanded gases from the cylinders as the pistons return to such outer ends and then close for the power stroke of the piston in the respective cylinder. Inlet fluid pressure is supplied to the cylinders of the rotating fluid pressure engine 10 by an inlet conduit 15 which connects with a bore 12a in the engine output shaft 12. Bore 12a is in turn connected to a suitable source 18 of fluid pressure through a conventional fluid coupling 17.

Fluid pressure engine 10 is secured to the engine output shaft 12 in any conventional fashion such as by a hub 16 having a flange portion 16a bolted to the engine housing and a hub portion 16b keyed to the engine output shaft 12 by a key 16c.

For the centrifugal piston expander engine to function, it is necessary that the engine be rotating at a sufficient speed to ensure that sufficient centrifugal force is exerted on the pistons to return them to their outer positions in the respective cylinders. This essentially means that a starting motor has to be provided and such motor 20 is here shown as being a direct current motor driven by a battery B. The output shaft of motor 20 is geared up through a suitable gear box here schematically represented as a small gear 21 cooperating with a large gear 22 which is keyed to the engine output shaft 12. The motor 20 is of the type that will normally maintain a reasonably constant speed but, if driven over its normal speed, will function as a generator and produce a reverse current flow to battery B, thus effecting the recharging of the battery B.

The end of the engine output shaft 12 is keyed to one rotary element 30a of a conventional unidirectional rotating or overrunning clutch 30. Such clutch, which may comprise a "Form sprag" clutch sold by DANA CORPORATION of Toledo, OH. comprises a telescopically related inner element 30a and an outer element 30b. The elements are interconnected for rotation in one direction relative to each other by a plurality of peripherally spaced sprags (not shown). The outer element 30b is secured by bolts 30c, or otherwise suitably secured to a load output pulley or gear 40 which is keyed to a stubshaft 45 supported by a bearing pillar 14.

The unidirectional clutch 30 is positioned so that the power output direction of the engine shaft 12 corresponds to the driving connection between inner and outer clutch elements 30a and 30b. Thus, during the power stroke of the pistons of the engine 10, a rotational force is transmitted through the unidirectional clutch 30 to the load driving element 40. Whenever the torque of the engine 10 is reduced in value or even reverses, there are no adverse effects on the load driving member 40 since, by virtue of the unidirectional clutch 30, the load driving member 40 can coast independently of the reduced speed of the engine output shaft 12.

The combination of the motor-generator unit 20 and the unidirectional clutch 30 has the combined effect of substantially minimizing the speed fluctuations of the load driving member 40. As previously mentioned, anytime that the speed of the engine output shaft 12 reduces from the normal value generated by the starting motor 20, the starting motor 20 will draw current from the battery B to return the speed of the engine output shaft 12 to the desired value. At the same time, when the motor output shaft 12 tends to drive the motor-generator 20 at a speed in excess of its normal operating speed, it functions as a generator and returns power to the battery. Thus, the motor-generator unit in effect functions as an electric flywheel. In addition, the fluctuations in speed of the motor output shaft 12 do not have deleterious effects on the rotation of the load output member 40 which is free to coast anytime that the speed of the engine output shaft 12 falls below the speed of the load output member 40.

Figure 2:
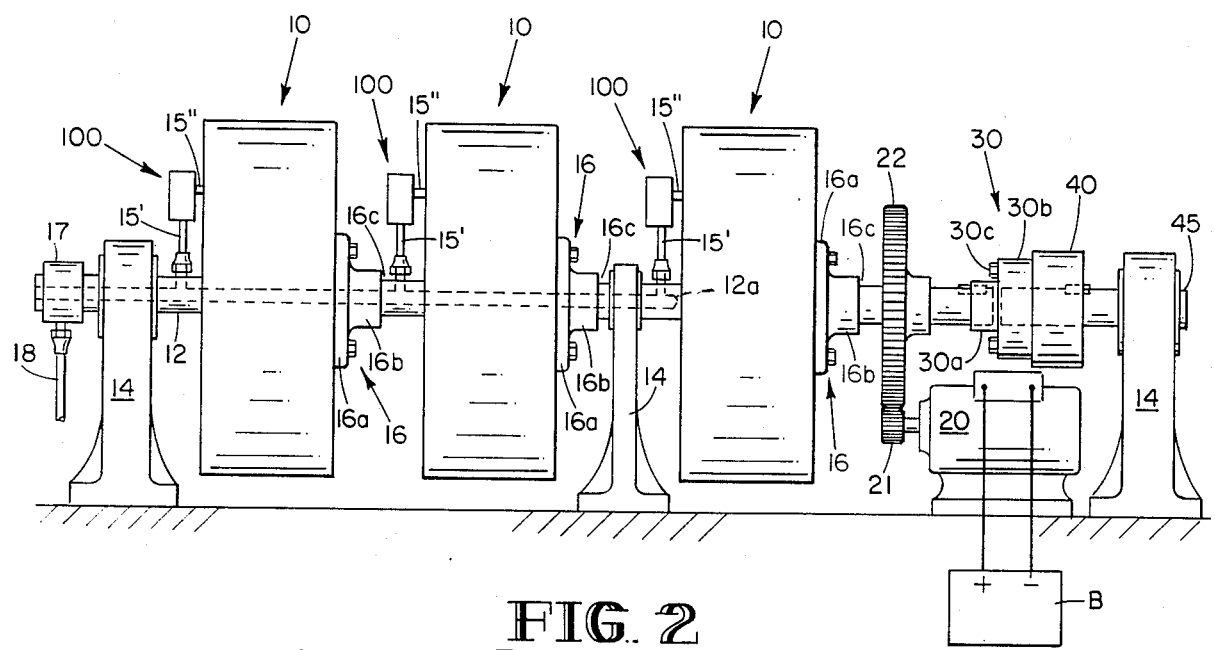
FIG. 2 schematically represents a modification of this invention wherein the method incorporates the utilization of a plurality of centrifugal piston expander engines driving a common load output shaft.

Further refinement of the load speed control may be produced by the modification schematically illustrated in FIG. 2 of the drawings wherein a plurality of free piston fluid pressure engines 10, such as centrifugal piston expander engines, are mounted in axially spaced relationship on a common engine output shaft 12 having a hollow bore 12a. The connections of the engine output shaft 12 to the starting motor 20 and through a unidirectional or overrunning clutch 30 to the output load driving member 40 are the same as previously described.

The differences in this modification is that the fluid pressure applied to the input of each engine is controlled by a fluid pressure input valve 100. Such valve may be electrically operated so as to apply inlet fluid pressure in different timed sequences, thus assuring that the power stroke of the pistons in one engine occurs at a different time than the power stroke of the pistons in another engine.

Further, by automatically activating or deactivating one or more centrifugal piston engine units in a plurality of centrifugal piston expander engines described in FIG. 2, variable dispacement may be provided to accommodate varying load conditions and torque requirements. The deactivated engines consume very little power since the free pistons are not reciprocating in their respective cylinders.

Figure 3:
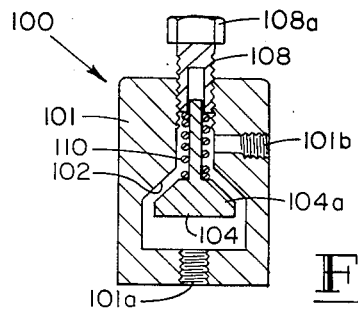
FIG. 3 is a schematic sectional view of a speed-responsive fluid pressure inlet valve.

FIG. 3 illustrates a third embodiment of this invention wherein the fluid pressure inlet control valve 100 is, in effect, operated in response to the rotational speed of the engine output shaft 12. The fluid pressure inlet valve 100 in this instance comprises a valve housing having an inlet connection 101a in its bottom to the pipe 15' which connects with the hollow bore 12a of the engine output shaft 12. Valve housing 101 further defines a generally radially disposed outlet port 101b connecting with pipe 15' leading to the interior of the respective fluid pressure engine 10. Intermediate the ports 101a and 101b, the valve housing defines a tapered valve seat 102 with which a radially shiftable T-shaped valve 104 cooperates. Valve 104 has a head portion 104a which is urged by a spring 110 out of seating engagement with the valve seat 102. As the rotational speed of the engine output shaft 12 increases, however, centrifugal force acting on the T-shaped valve 104 compresses the valve spring 110 and permits the T-shaped valve head 104a to move into engagement with the valve seat 102 and thus effect the cutoff of fluid pressure supply to the particular engine 10. The compression springs 110 are individually adjustable by a spring seating cap 108 which is threadably engaged in the outer end of the valve housing 101 and has a bolt-shaped head portion 108a projecting out of the valve housing 101 to permit convenient adjustment of the amount of compression applied to each of the valves 104. Thus, under start-up conditions, when it is desired to supply as much torque as possible to the load element, the springs 110 are adjusted so that all valves are in their open position, hence all of the fluid pressure engines 10 will be energized during start-up. As the speed increases, the prior adjustment of the springs 110 by spring seats 108 may permit one engine to be dropped out at say 500 rpm, and the second engine dropped off at say 1,000 rpm, permitting the load to be driven at the full speed of say 1,200 rpm by a single fluid pressure engine 10, while the other engines just rotate, functioning as flywheels.

On the other hand, if the load to be driven by the load output driving member 40 requires a relatively small starting torque but much larger torque at higher speed, then the valves 100 may be readily designed to permit fluid flow only to one engine 10 at the starting speed generated by motor-generator 20 and to open as the speed of shaft 12 increases to supply fluid pressure sequentially to the other engines 10. In either event, the flexibility of the aforedescribed apparatus in achieving a desired speed-torque relationship by variable displacement will be apparent to those skilled in the art.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of minimizing rotational speed variations of a centrifugal piston expander engine comprising the steps of:
    (1) supplying a pressured gas to a centrifugal piston expander engine having a rotatable output element and a discharge conduit for cooled exhaust gas;
    (2) expanding and cooling the pressured gas in the centrifugal piston expander engine to produce cyclically varying oppositely directed, positive and negative torques on said rotatable output shaft;
    (3) driving a rotary load in the positive torque direction by said rotatable output element through one rotatable element of a unidirectional clutch having two rotating elements relatively movable in only the negative torque direction; and
    (4) connecting a battery operated motor-generator unit to said rotatable output shaft to supplement the rotary speed of said output shaft during periods of negative torque output by said centrifugal piston expander engine and to recharge said battery during periods of maximum positive torque output of said centrifugal expander engine.

2. The method of extracting mechanical energy from a pressured gas comprising the steps of:
    (1) connecting a plurality of centrifugal expander engines to a common output shaft, each said engine having free pistons centrifugally displacable to a radially outer position;
    (2) connecting a battery operated motor-generator unit to said output shaft by speed reduction gearing whereby normal speed rotation of said motor-generator unit results in a lower speed rotation of said power output shaft sufficient to move said free pistons to their radially outer positions; and
    (3) applying fluid pressure to the inlet of each engine only when the output shaft speed drops below a preselected value for each engine, thereby varying the total displacement.

3. The method of extracting mechanical energy from a pressured gas comprising the steps of:
    (1) connecting a plurality of free piston fluid pressure engines to a common rotatable output shaft;
    (2) selectively applying pressured gas to the inlets of said fluid pressure engines only whenever a particular engine is rotating at a speed below a selected speed, whereby all of said engines are energized during start up and
    (3) sucessively reducing the number of fluid pressure engines supplied with pressured gas as the output shaft approaches a desired speed of rotation, thereby reducing the speed fluctuations of said output shaft by variable displacement.

4. The method of extracting mechanical energy from a plurality of centrifugal piston expander engines generating cyclically varying positive and negative torques, comprising the steps of:
    (1) connecting a plurality of centrifugal expander engines to a common rotatable output shaft;
    (2) driving a rotary load in the positive torque direction by said output shaft through a unidirectional clutch;
    (3) connecting a battery operated motor-generator unit to said output shaft to supplement the rotary speed of said output shaft during periods of negative torque output by said output shaft and to recharge said battery during periods of positive torque output of said output shaft;
    (4) selectively applying pressured gas to the inlets of said centrifugal expander engines whenever a particular engine is rotating at a speed below a selected speed, whereby all of said engines are energized during start up; and
    (5) successively reducing the number of said engines supplied with pressured gas as the output shaft approaches a desired speed of rotation in the positive direction, thereby reducing the speed fluctuation of said output shaft by variable displacement.

* * * * *